United States Patent
Seshita et al.

(10) Patent No.: US 6,909,214 B2
(45) Date of Patent: Jun. 21, 2005

(54) MOTOR-CONTAINED ELECTRIC ACTUATOR

(75) Inventors: Naoto Seshita, Kawasaki (JP); Yoshinori Yamauchi, Atsugi (JP)

(73) Assignee: Igarashi Electric Works Ltd., Kawasaki (JP)

( * ) Notice: Subject to any disclaimer, the term of this patent is extended or adjusted under 35 U.S.C. 154(b) by 41 days.

(21) Appl. No.: 10/620,991

(22) Filed: Jul. 16, 2003

(65) Prior Publication Data

US 2004/0061399 A1 Apr. 1, 2004

(30) Foreign Application Priority Data

Jul. 19, 2002 (JP) .......................................... 2002-210662

(51) Int. Cl.[7] .............................................. H02K 7/06
(52) U.S. Cl. ...................................................... 310/80
(58) Field of Search ...................................... 310/20, 80

(56) References Cited

U.S. PATENT DOCUMENTS

| | | | | |
|---|---|---|---|---|
| 4,787,245 A | * | 11/1988 | Anderson et al. | 73/168 |
| 5,517,070 A | * | 5/1996 | Schmidt | 310/89 |
| 6,476,862 B1 | * | 11/2002 | Tatsumi et al. | 348/14.08 |
| 6,515,399 B1 | * | 2/2003 | Lauf et al. | 310/239 |
| 6,667,562 B1 | * | 12/2003 | Heinrich | 307/10.1 |

* cited by examiner

Primary Examiner—Darren Schuberg
Assistant Examiner—Judson H. Jones
(74) Attorney, Agent, or Firm—Davis & Bujold, P.L.L.C.

(57) ABSTRACT

A small motor in a casing has a motor shaft, which has a worm outside the casing. A worm wheel is rotatably mounted to a housing for a reduction mechanism and meshes with the worm. The motor shaft is supported by radial bearings in the housing, and is supported at the bottom by a thrust bearing thereby simplifying the structure. Furthermore, a rotary disc is fixed to the motor shaft to rotate together with the motor shaft. An angle of rotation of the motor shaft is detected by a rotation detector via the rotary disc and converted to a digital signal by an electronic circuit.

17 Claims, 5 Drawing Sheets

MOTOR-CONTAINED ELECTRIC ACTUATOR

BACKGROUND OF THE INVENTION

The present invention relates to a motor-contained electric actuator for controlling the posture of the backrest of a chair in a motor vehicle.

An electric actuator generally comprises a DC motor body and a worm reduction mechanism such as a worm wheel. This type of actuator comprises various functional parts that increase the total number of parts. In order to decrease the parts volume of the whole actuator, a small motor is integrally connected to a reduction mechanism. In this case, load resistance by a driver generates load in a thrust direction requiring provision of a bearing structure to support it.

To make an electric actuator smaller, a worm is directly formed on a motor shaft of a small motor to constitute a motor body and a reduction mechanism. Load acts in a radial direction to the motor shaft on which the workpiece is formed depending on load resistance. Thus it is necessary to provide a radial bearing on each side of the worm teeth.

In an electric actuator in which the worm is integrally connected with a reduction mechanism, it is necessary not only to provide a thrust bearing on each end of the motor shaft but also to provide a thrust-radial bearing at an axial end portion of the worm to lead troublesome construction of the electric actuator.

For example, when thrust is supported by a ball bearing at an axial end portion near the worm of the motor shaft, radial force acts on that portion and it thus requires a radial bearing.

A known motor-contained electric actuator makes not only the structure of the axial end portion more complicated but also the bearing structure of the reduction mechanism thus causing motor body assembly to be more complicated as well.

SUMMARY OF THE INVENTION

In view of the disadvantages, it is an object to provide a motor-contained electric actuator in which a small motor is integrally connected to a reduction mechanism to simplify the support structure of a motor shaft.

BRIEF DESCRIPTION OF THE DRAWINGS

The features and advantages of the invention will become more apparent from the following description with respect to embodiments as shown in the appended drawings wherein.

DETAILED DESCRIPTION OF PREFERRED EMBODIMENTS

FIGS. 1 to 4 illustrate the first embodiment of the present invention.

Figure 1:
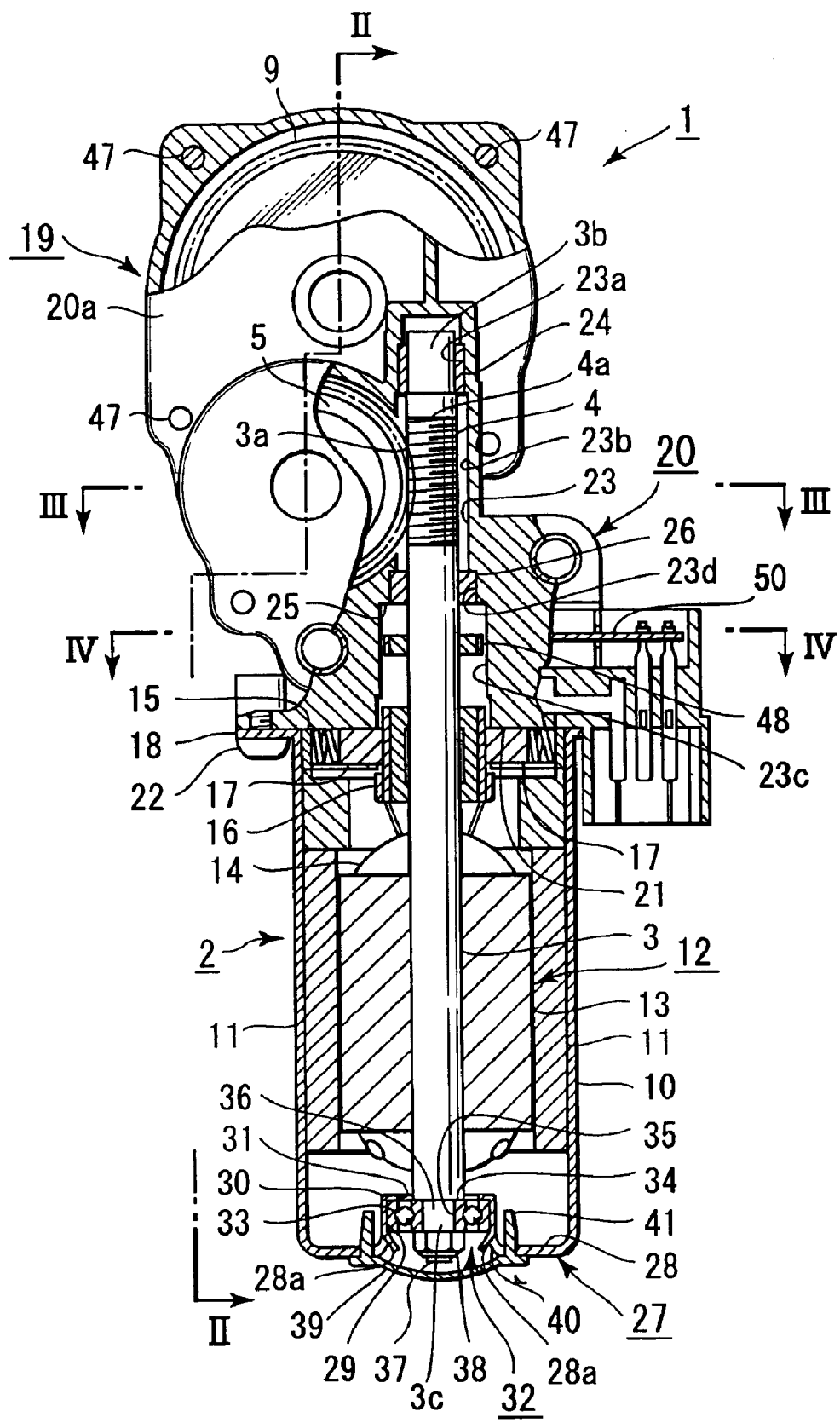
FIG. 1 is a front view in which main part is sectioned, of a motor-contained electric actuator according to the present invention.

FIG. 1 is a central vertical sectional front view taken along an axis of a motor shaft 3 of a small motor 2 of an electric actuator 1.

Figure 2:
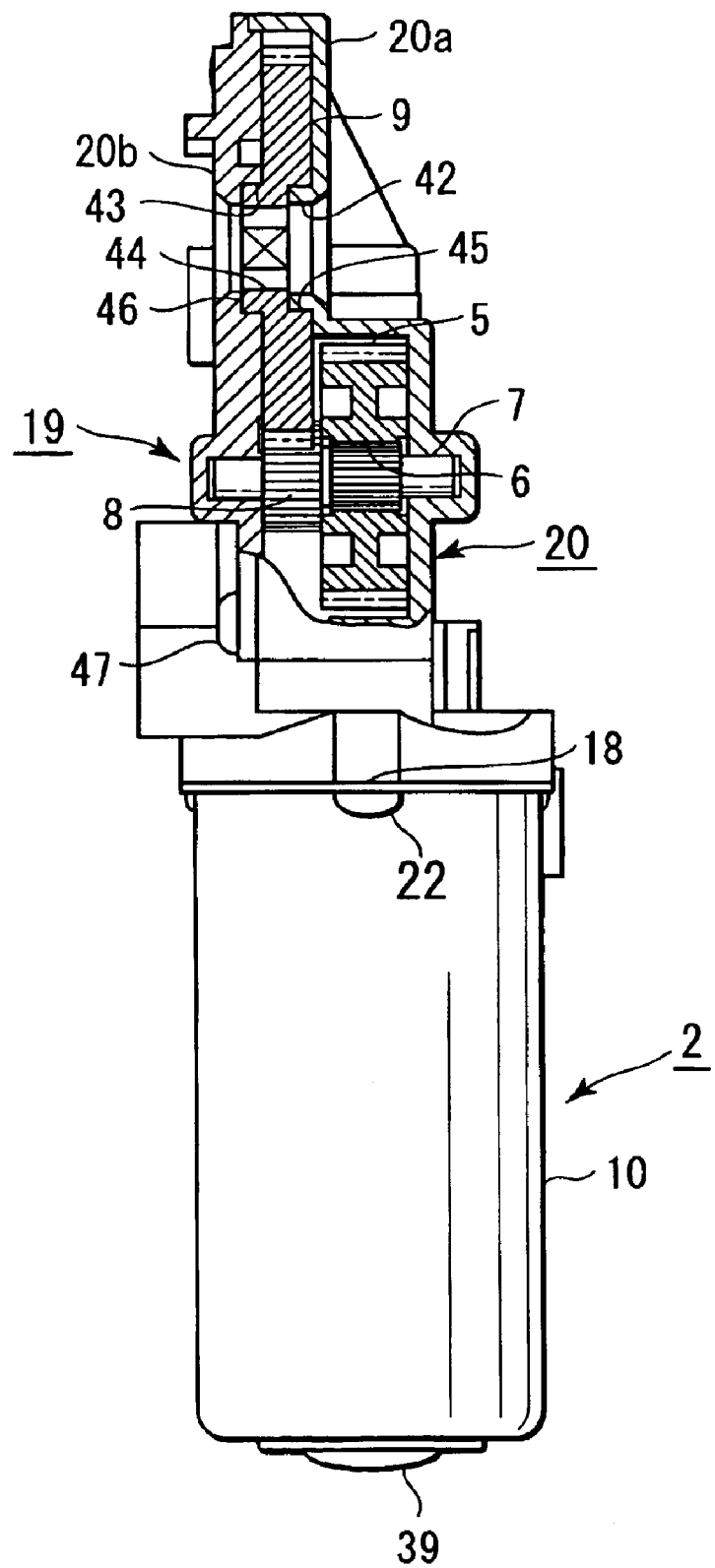
FIG. 2 is a sectional side view taken along the line II—II in FIG. 1.

FIG. 2 is a vertical sectional side view taken along the line II—II in FIG. 1. The line II—II passes through an axis of a worm wheel 5 which meshes with a worm 4 formed on the upper portion of the motor shaft 3 and an axis of a larger-diameter output gear 9 driven by an intermediate reduction gear 8 on a shaft 7 which is in spline engagement with a bore 6 of a worm wheel 5.

Figure 3:
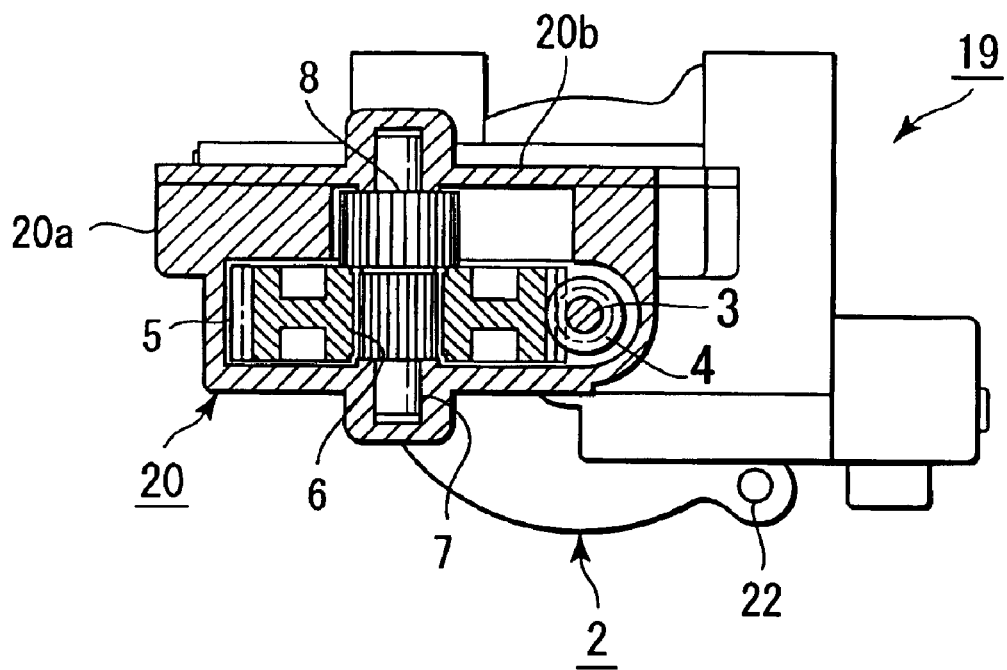
FIG. 3 is a sectional plan view taken along the line III—III in FIG. 1.

FIG. 3 is a sectional view taken along the line III—III in FIG. 1 and shows a horizontal section of the worm 4 and the worm wheel 5 which meshes with the worm 4.

Figure 4:
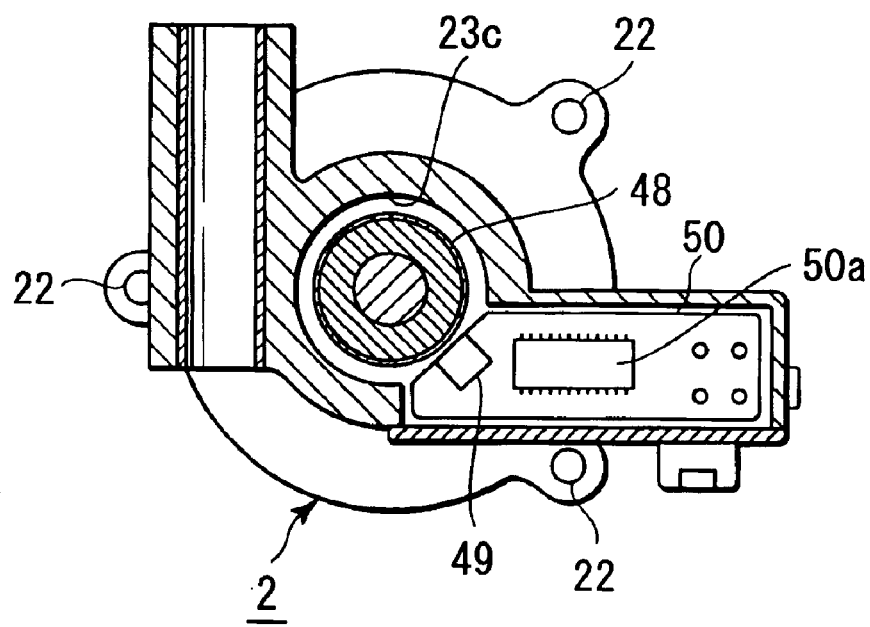
FIG. 4 is sectional plan view taken along the line IV—IV in FIG. 1.

FIG. 4 is a horizontal sectional view taken along the line IV—IV.

In a bottom-contained casing 10 which houses the small motor 2, there are provided a cylindrical permanent magnet 11; the motor shaft 3; a rotor 12 which is fixed to the motor shaft 3 and has a coil 14 wound on an iron core 13 in the permanent magnet 11; a commutator 16 fixed to the motor shaft 3 near an opening 15 of the casing 10; and a pair of brushes 17 in sliding contact with the commutator 16.

At the end of the opening 15 of the casing 10, an external flange 18 is provided and fixed to the lower surface 21 of a housing 20 by a screw 22. In the housing 20, the worm wheel 5 which constitutes a reduction mechanism 19; a shaft 7 having the intermediate gear 8 and the output gear 9 which meshes with the intermediate gear 8 are provided.

The motor shaft 3 extends through the opening 15. The outer circumferential surface 3a of the motor shaft 3 is engaged with teeth of the worm wheel 5, and the upper portion 3b is inserted in a bore 23 of the housing 20. The teeth of the worm wheel 5 meshes with the worm 4 of the motor shaft 3, the upper portion of which extends from the upper end 4a of the worm 4. The upper portion 3b is radially borne by an annular metal bearing 24 on the bore 23 in the housing 20.

The bore 23 comprises a larger-diameter bore 23a having a metal bearing 24; a larger-diameter bore 23b; and a larger-diameter bore 23c from a portion beneath the lower end of the worm 4 to the lower surface 21 of the housing 20.

An annular metal bearing 26 is provided above a stepped portion 25 between the larger-diameter bore 23b and the larger-diameter bore 23c.

The external diameter of the metal bearing 26 is smaller than the diameter of the lower larger-diameter bore 23c, larger than the upper larger-diameter bore 23b, and larger than the external diameter of the metal bearing 24.

The metal bearing 24 is engaged on the upper portion 3b slightly smaller in diameter than the lower portion of the motor shaft 3. The metal bearing 24 is smaller in diameter than the larger-diameter bore 23b. Under the larger-diameter bore 23b of the bore 23, the metal bearing 26 is engaged in a bore 23d. The middle portion of the motor shaft 3 is radially born by the metal bearing 26.

The upper metal bearing 24 and the intermediate metal bearing 26 are equidistantly positioned axially of the motor shaft 3 from a portion in which the worm 4 is engaged with the worm wheel 5.

The metal bearing 24 is thinner than the metal bearing 26.

The metal bearing 24 is smaller in diameter than the metal bearing 26, so that it can be easily inserted through the bore 23.

In the motor shaft 3, a lower portion 3c opposite the upper portion 3b is fixed to the bottom 27 of the casing 10 and is rotatably mounted by a thrust-radial ball bearing 32.

On the middle of the bottom 27 of the casing 10, a bottom plate 28 is projected inward to form an expanded bore 29.

On the bottom 30 of the expanded bore 29, there is formed a through-bore 31 for the motor shaft 3 slightly smaller in diameter than the expanded bore 29 and slightly larger in diameter than the motor shaft 3.

In the expanded bore 29, the thrust-radial ball bearing 32 is coaxial with the motor shaft 3, and the outer circumferential surface of an outer race 33 is engaged in the expanded bore 29.

A plurality of caulking-preventions 28a are formed by cutting the bottom plate 28. After the thrust-radial ball bearing 32 is put in the expanded bore 29, the caulking-preventions 28a are bent inward under the outer race 33 thereby preventing the outer race 33 from getting out.

A smaller-diameter portion 36 at the lower end of the motor shaft 3 is inserted in a bore 35 of an inner race 34. On a male thread 37 at the lower end of the smaller-diameter portion 36, a lock nut 38 having a female thread is engaged upward. Thus, the inner race 34 and the motor shaft 3 are respectively fixed not to move axially at the lower end of the casing 10.

The thrust-radial ball bearing 32 is mounted so that the outer race 32 and the inner race 34 is rotatable as not to move in an axial or thrust direction. Thus, the motor shaft 3 is rotatable at the lower end of the casing 10 and prevented from moving axially.

The expanded bore 39 in which the thrust-radial ball bearing 32 is fitted is covered by a cap 39, which is fixed by engaging an engagement member 41 of the cap 39 in a bore 40 formed by cutting the caulking-prevention 28.

The worm wheel 5 rotated by the worm of the motor shaft 3 allows the output gear 9 to rotate with reduction of speed via the intermediate gear 8 of the shaft 7 which is in spline engagement with the axial bore 6 of the worm wheel 5.

A groove 45 around an axial bore 44 and a projection 46 of the output gear 9 are engaged with an inward projection 42 of a front plate 20a and a groove 43 of a rear plate 20b of the housing 20, so that the output gear 9 is rotatably mounted to the housing 20. The axial bore 44 of the output gear 9 is not circular so that a connecting member connected to a driven mechanism may not be rotatably connected.

After the gears are mounted to the housing 20, the front and rear plates 20a and 20b are fixed by a screw 47.

On the motor shaft 3, a rotary disc 48 is fixed on the motor shaft 3 to rotate together with the motor shaft 3.

As shown in FIG. 4, at the side of the rotary disc 48, the housing 20 has an electronic circuit substrate 50 having a rotation detector 49 for electrically detecting rotation of the rotary disc 48. An electronic circuit 50a on the electronic circuit substrate 50 calculates a direction and an angle of rotation of the rotary disc 48 and the motor shaft 3 detected by the rotation detector 49 to convert the detected value to a digital signal.

The rotation detector 49 may output the angle and direction of rotation without conversion.

In the rotary disc 48 and the rotation detector 49 which constitutes a magnetic non-contact rotation detecting sensor, magnetized material is provided to direct a magnetic pole in a rotational direction on the outer circumferential surface of the rotary disc 48, and the rotation detector 48 comprises a hall element which is provided near the outer circumferential surface of the rotary disc 48.

In the rotary disc 48 and the rotation detector 48 which constitutes an optical non-contact rotation detecting sensor, a slit through which light passes or a black-and-white pattern which reflects or absorbs light is provided on the outer circumferential surface of the rotary disc 48, and the rotation detector 49 which comprises a photo-coupler is disposed near the outer circumferential surface of the rotary disc 48.

Furthermore, the electronic circuit 50a has a non-volatile memory for memorizing the digital signal thereby measuring the angle of rotation as absolute value from the start of the measurement.

Similarly, the electronic circuit 50a has a memory which stores memorized data by battery thereby measuring the angle of rotation as absolute value from staring of the measurement.

Figure 5:
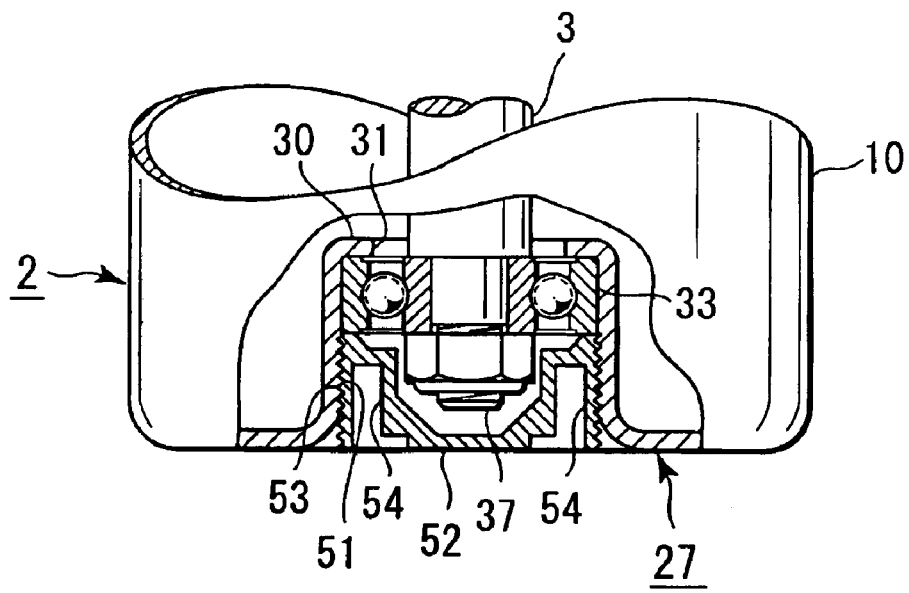
FIG. 5 is a partial sectional view of another embodiment of a thrust-radial ball bearing fixed to the bottom.
Figure 6:
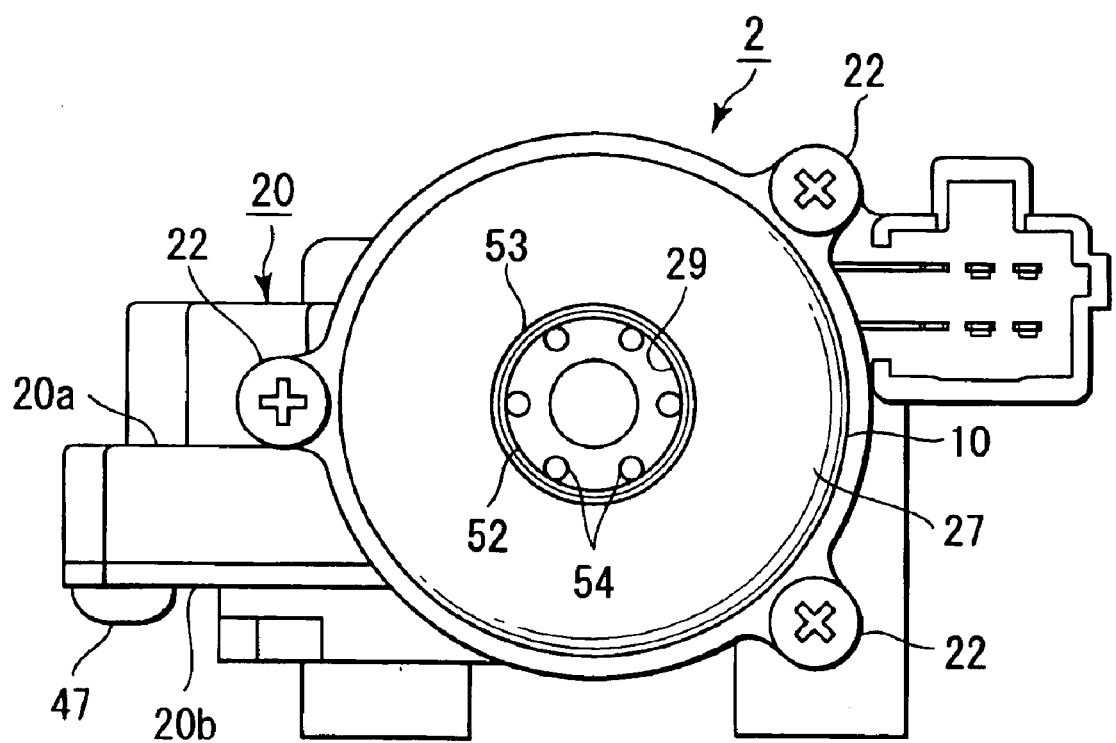
FIG. 6 is a bottom plan view of FIG. 5.

FIGS. 5 and 6 illustrate another embodiment in which an outer race 33 of a thrust ball bearing 32 is fixed to the bottom 27 of a casing 10 for a small motor 2.

A female thread 51 is formed on the inner circumferential surface of a bore 29 at the bottom 27. A cover 52 having a male thread 53 on the outer circumferential surface meshes with the female thread 51. An outer race 33 is held between the top 30 of the bore 29 and the cover 52, and a thrust-radial ball bearing 32 is inserted in the bore 29 to prevent it from becoming removed.

FIG. 6 is a bottom view of FIG. 5, and the cover 52 has a plurality of bores 54 in which a driver for inserting the cover 52 is engaged.

Figure 7:
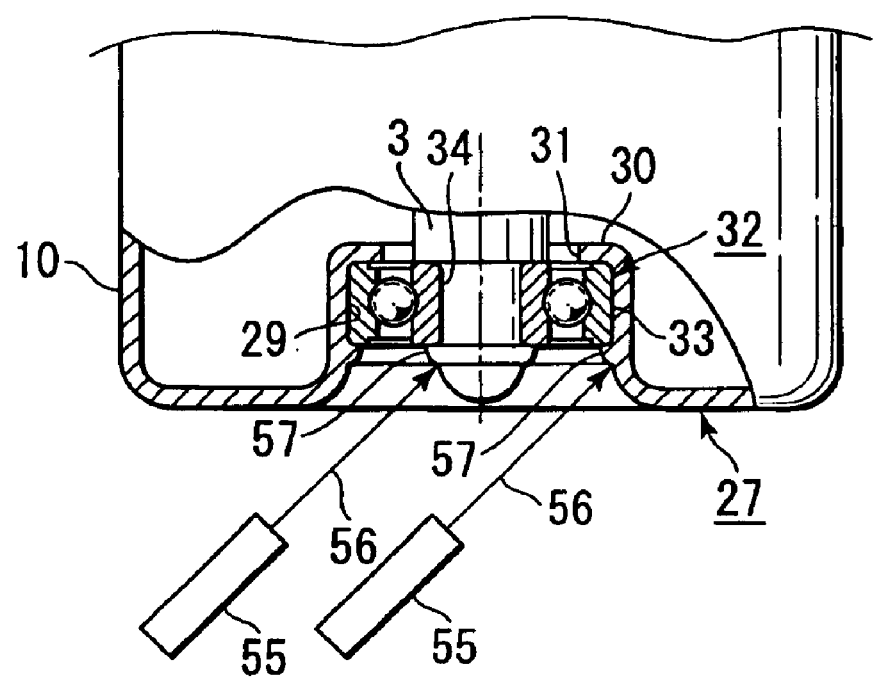
FIG. 7 is a partially sectioned view of further embodiment of a thrust-radial ball bearing fixed to the bottom.

FIG. 7 illustrates further embodiment for fixing an outer race 33 of a thrust-radial ball bearing 32 to the bottom 27 of a casing 10 for a small motor and for fixing an inner race 34 of a thrust-radial ball bearing 32 to a motor shaft 3.

In this embodiment, after the thrust-radial ball bearing 32 is engaged in a bore 29 of the bottom 27, laser beams 56,56 are radiated onto the inner surface of the bore 29 and the outer circumferential surface 4 of a smaller-diameter portion 36 at the lower end of the motor shaft 3 from a laser welding machine 55,55, and at the same time, either of the laser welding machines 55,55 and the casing 10 is rotated around an axis of the motor shaft 3 to form welded or padded portions 57,57 on the inner surface of the bore 29 and the outer circumferential surface of the smaller-diameter portion 36 thereby fixing the outer race 33 onto the inner surface of the bore 29 and the inner race 34 onto the outer circumferential surface of the smaller-diameter portion 36 of the inner race 34 and preventing them from falling out.

Therefore, the female screw 38 avoids falling out thus achieving speedier operation and likewise reducing the number of parts.

The welded portion 57 may be formed on the inner surface of the bore 29 or the outer circumferential surface of the smaller-diameter portion 36, and it may be omitted in the other, or fixed by another fixing means.

The foregoing merely relates to embodiments of the present invention. Various changes and modifications may be made by a person skilled in the art without departing from the scope of claims wherein:

What is claimed is:

1. An electric actuator comprising:
   a bottom-contained casing;
   a motor in the casing;
   a motor shaft, for the motor, extending through an opening of the casing;
   a housing fixed to the opening of the casing;
   a worm on a portion of the motor shaft in the housing;
   a worm wheel rotatably mounted to the housing to mesh with the worm;

a first radial bearing which supports the motor shaft between an axial end and the worm of the motor shaft;

a second radial bearing which supports the motor shaft opposite the axial end near the worm; and a thrust bearing at the bottom of the casing to support the motor shaft, wherein the first and second bearing are made of metal and equidistantly spaced from the worm.

2. An electric actuator comprising:

a bottom-contained casing;

a motor in the casing;

a motor shaft, for the motor, extending through an opening of the casing;

a housing fixed to the opening of the casing;

a worm on a portion of the motor shaft in the housing;

a worm wheel rotatably mounted to the housing to mesh with the worm;

a first radial bearing which supports the motor shaft between an axial end and the worm of the motor shaft;

a second radial bearing which supports the motor shaft opposite the axial end near the worm; and a thrust bearing at the bottom of the casing to support the motor shaft;

wherein the first bearing is smaller in external diameter than the second bearing.

3. An electric actuator comprising:

a bottom-contained casing;

a motor in the casing;

a motor shaft, for the motor, extending through an opening of the casing;

a housing fixed to the opening of the casing;

a worm on a portion of the motor shaft in the housing;

a worm wheel rotatably mounted to the housing to mesh with the worm;

a first radial bearing which supports the motor shaft between an axial end and the worm of the motor shaft;

a second radial bearing which supports the motor shaft opposite the axial end near the worm; and a thrust bearing at the bottom of the casing to support the motor shaft;

wherein the thrust bearing comprises a thrust-radial ball bearing to support the motor shaft rotatably.

4. An actuator as claimed in claim 3 wherein a bore which projects from the bottom of the casing is formed, an inner race of the thrust-radial ball bearing being fixed to an axial end portion of the motor shaft, an outer race being fixed to an inner circumferential wall of the bore.

5. An actuator as claimed in claim 3 wherein an inner race of the thrust-radial ball bearing is engaged on a smaller-diameter portion of the motor shaft, a female thread of a lock nut meshing with a male thread of the smaller-diameter portion of the motor shaft.

6. An actuator as claimed in claim 3 wherein an inner race of the thrust-radial ball bearing is engaged on a smaller-diameter portion of the motor shaft, the thrust-radial ball bearing being held by one of a welded or a padded portion of one of the smaller-diameter portion or the casing.

7. An actuator as claimed in claim 6 wherein the one of the welded or padded portion is formed by radiating a laser beam.

8. An electric actuator comprising:

a bottom-contained casing;

a motor in the casing;

a motor shaft for the motor which extends through an opening of the casing;

a housing fixed to the opening of the casing;

a worm on a portion of the motor shaft in the housing;

a worm wheel rotatably mounted to the housing to mesh with the worm;

a first radial bearing which supports the motor shaft between an axial end and the worm of the motor shaft;

a second radial bearing which supports the motor shaft opposite the axial end near the worm;

a thrust bearing at the bottom of the casing to support the motor shaft;

a rotary disc which is fixed to the motor shaft to rotate together with the motor shaft;

a rotation detector for electrically detecting an angle of rotation; and encoding means for converting the angle of rotation into a digital signal;

wherein an electronic circuit has a non-volatile memory to measure the angle of rotation as absolute value.

9. An actuator as claimed in claim 8 wherein a direction of rotation is detected by the rotation detector in addition to the angle of rotation with both of the angle and direction of the rotation being converted into a digital signal by the encoding means.

10. An actuator as claimed in claim 8 wherein the encoding means comprises an electronic circuit on an electronic circuit substrate.

11. An actuator as claimed in claim 8 wherein the outer circumferential surface of the rotary disc has magnetic material in which a magnetic pole is directed in a rotational direction, and the rotation detector being a hall element.

12. An actuator as claimed in claim 8 wherein the outer circumferential surface of the rotary disc has a slit through which light passes, or a black-and-white pattern which reflects or absorbs light, and the rotation detector being a photo coupler.

13. An electric actuator comprising:

a bottom-contained casing;

a motor in the casing;

a motor shaft for the motor which extends through an opening of the casing;

a housing fixed to the opening of the casing;

a worm on a portion of the motor shaft in the housing;

a worm wheel rotatably mounted to the housing to mesh with the worm;

a first radial bearing which supports the motor shaft between an axial end and the worm of the motor shaft;

a second radial bearing which supports the motor shaft opposite the axial end near the worm;

a thrust bearing at the bottom of the casing to support the motor shaft;

a rotary disc which is fixed to the motor shaft to rotate together with the motor shaft;

a rotation detector for electrically detecting an angle of rotation; and encoding means for converting the angle of rotation into a digital signal;

wherein an electronic circuit has a memory in which stored data is kept by battery to measure the angle of rotation as absolute value.

14. An actuator as claimed in claim 13 wherein a direction of rotation is detected by the rotation detector in addition to the angle of rotation with both of the angle and the direction of the rotation being converted into a digital signal by the encoding means.

15. An actuator as claimed in claim 13 wherein the encoding means comprises an electronic circuit on an electronic circuit substrate.

16. An actuator as an outer circumferential surface of the rotary disc has magnetic material in which a magnetic pole is directed in a rotational direction, and the rotation detector being a hall element.

17. An actuator as claimed in claim 13 wherein an outer circumferential surface of the rotary disc has one of a slit through which light passes and a black-and-white pattern which one of reflects and absorbs light, and the rotation detector being a photo coupler.

* * * * *